April 8, 1969  R. O. SCHLECHT  3,436,881
PREFABRICATED STRUCTURE AND A JOINT ASSEMBLY THEREFOR
Filed Jan. 20, 1967  Sheet 1 of 4
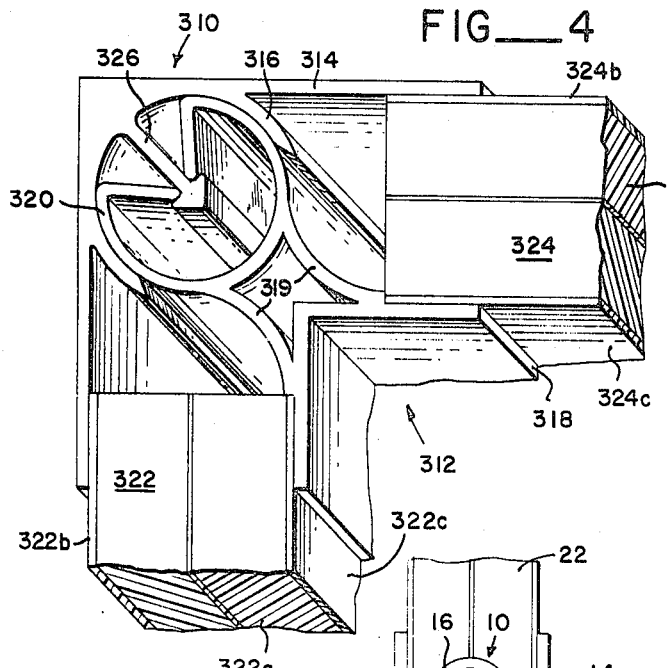
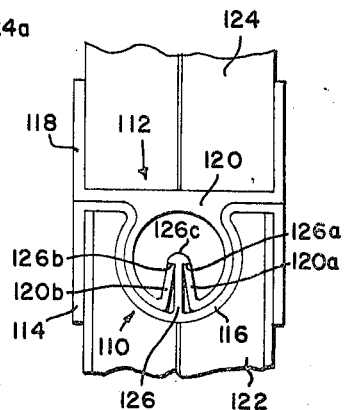
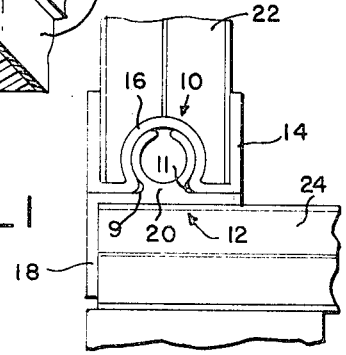
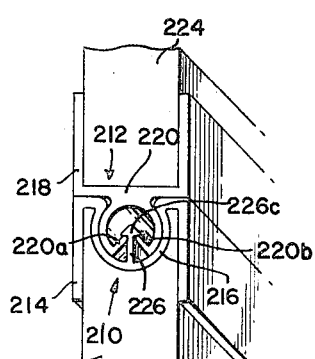
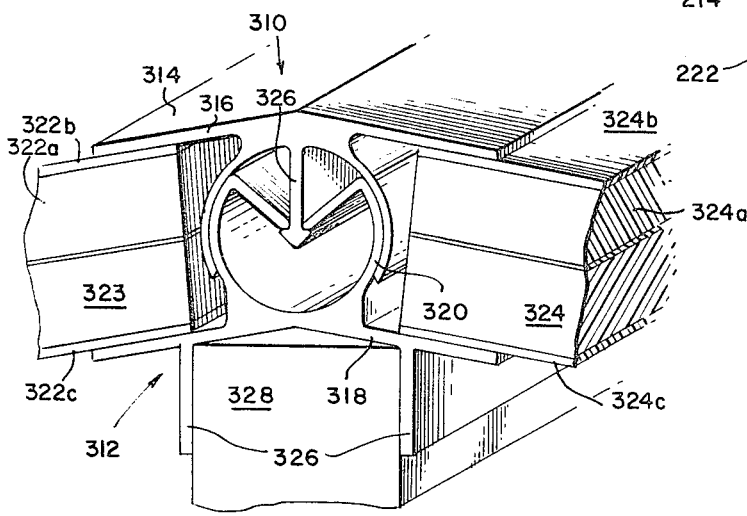
RALPH O. SCHLECHT
INVENTOR.
BY *Seed v Berg*
ATTORNEYS

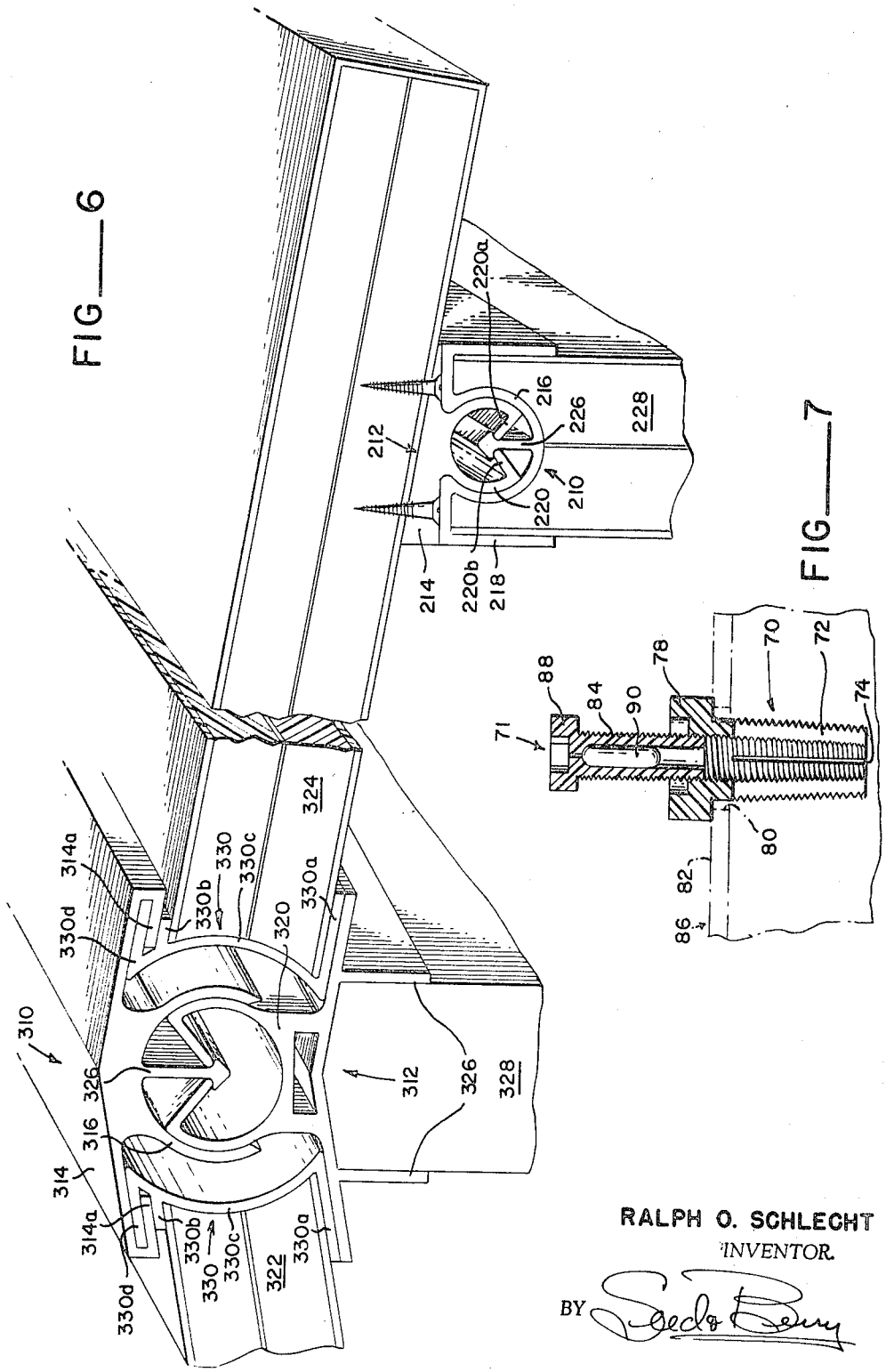

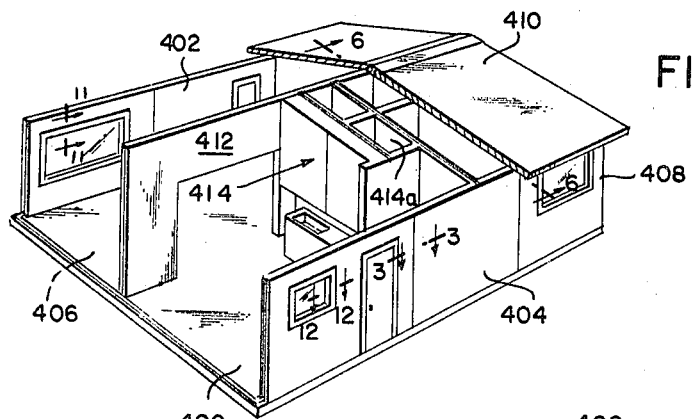
FIG__8
FIG__9
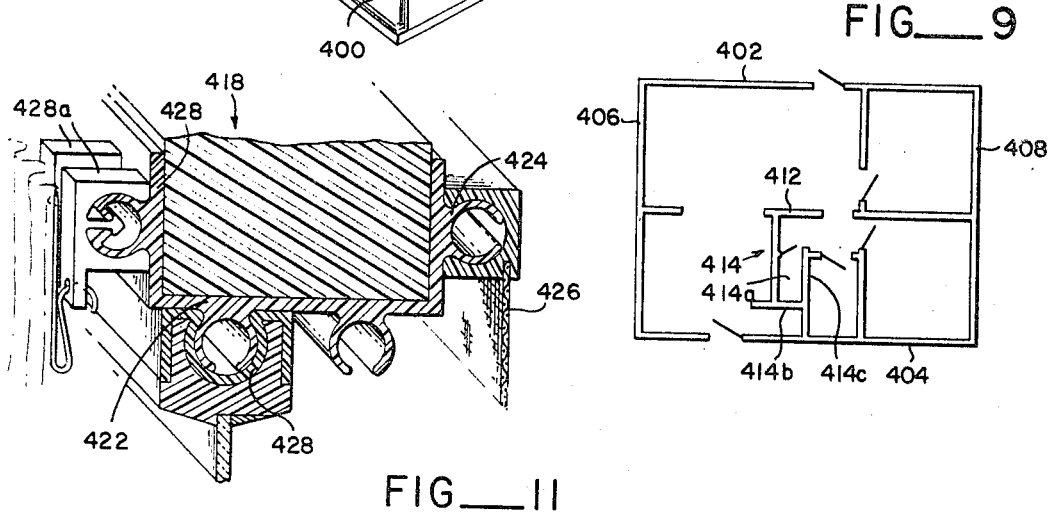
FIG__11
FIG__10
FIG__12
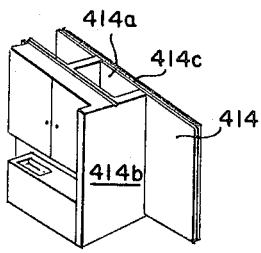
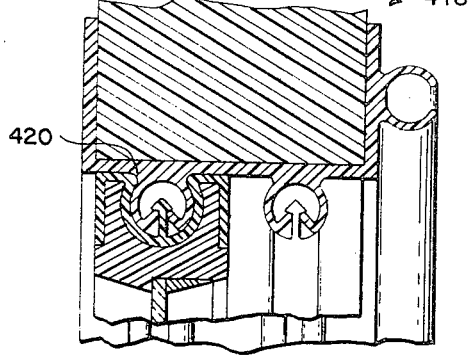
RALPH O. SCHLECHT
INVENTOR.
ATTORNEYS April 8, 1969        R. O. SCHLECHT        3,436,881
PREFABRICATED STRUCTURE AND A JOINT ASSEMBLY THEREFOR
Filed Jan. 20, 1967        Sheet 4 of 4
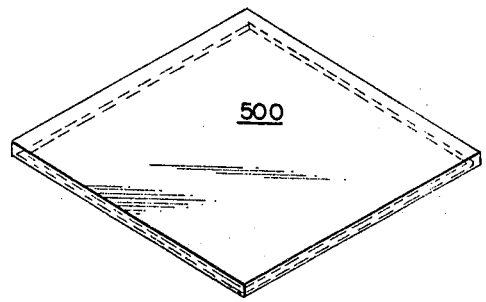
FIG__13
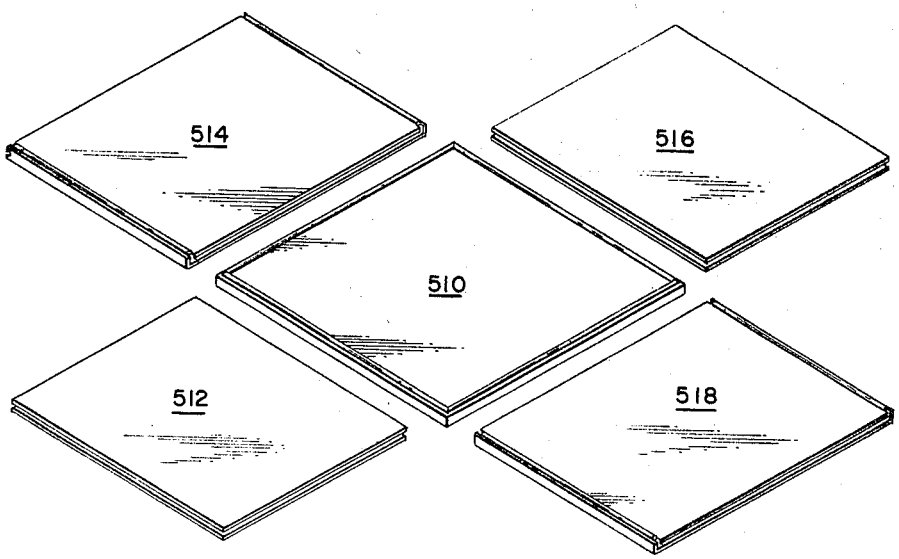
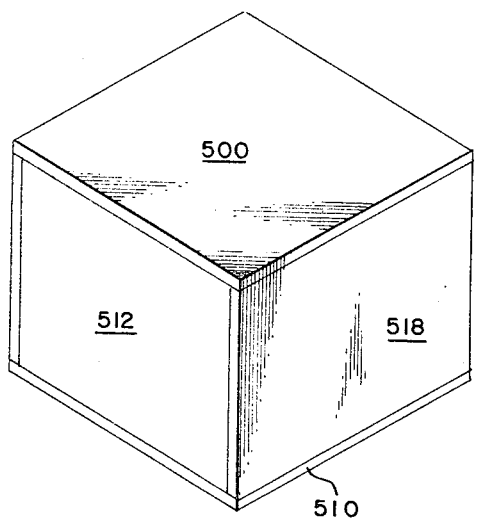
FIG__14
RALPH O. SCHLECHT
INVENTOR.
ATTORNEYS United States Patent Office 3,436,881
Patented Apr. 8, 1969

3,436,881
PREFABRICATED STRUCTURE AND A
JOINT ASSEMBLY THEREFOR
Ralph O. Schlecht, Seattle, Wash.
(10522 Highway 3, Bremerton, Wash. 98310)
Filed Jan. 20, 1967, Ser. No. 610,603
Int. Cl. E04b 7/02; E04c 1/10, 1/30
U.S. Cl. 52—90                                    25 Claims

ABSTRACT OF THE DISCLOSURE

A joint structure comprises two interlocking components having sections that interfit transversely rather than axially. One interfitting section may be provided with a radial locking member adapted to extend into the interior of the other member and retained by ledges within the other member.

---

This invention relates to joint structures and the application of such joint structures to structural panels, houses, storage crates, and other structural configurations. More particularly, this invention relates to joint structures which comprise two components designed to be interfitted laterally in tongue and groove fashion.

Joint structures comprising two components designed to be axially interfitted to provide a relatively stable joint between adjacent panels have been heretofore proposed. These joint structures have comprised rigid tubular male and female members that are axially interfitted by telescoping the male member into the female member. If these joint structures have an appreciable longitudinal length, or are attached to relatively large panels or the like, or are attached to structures having a geometry that prevents such an axial interfit, then such joint structures become impractical because of the necessity of axially interfitting the male and female members.

A primary object of this invention is to provide a joint structure comprised of two components having sections that interfit transversely, one within the other, rather than axially. Another object is to provide such a joint structure wherein the two components are locked against transverse separation after having been interfitted. A further object is to provide a structural panel incorporating the joint structure. Still another object is to provide a prefabricated structure employing the joint structure.

These and other objects and advantages will become apparent from the following description in conjunction with the accompanying drawings, of which:

FIG. 1 depicts two components of a non-locking joint structure with interfitted male and female sections;

FIG. 2 depicts two components of a locking joint structure with interfitted male and female sections;

FIG. 3 depicts another embodiment of a locking joint structure similar to the FIG. 2 structure;

FIG. 4 depicts still another embodiment of a locking joint structure;

FIGS. 5 and 6 depict two further embodiments of a locking joint structure suitable for use in roof assemblies;

FIG. 7 depicts a threaded connecting device suitable for attaching joint structure components to a panel such that the panel can expand and contract relative to the joint structure;

FIG. 8 is a perspective view of an exemplary prefabricated house, with one end wall and a roof panel portion removed, employing joint structures in accordance with this invention;

FIG. 9 is a floor plan of the FIG. 8 house;

FIG. 10 is a perspective detail view of one prefabricated portion of the FIG. 8 house;

FIGS. 11 and 12 are detail cross sections, taken along the lines 11—11 and 12—12 in FIG. 8, illustrating the window construction of the FIG. 8 house;

FIG. 13 depicts a knock-down crate structure in disassembled form with panels provided with joint structures in accordance with this invention; and FIG. 14 depicts the FIG. 13 crate in assembled form.

In brief, the joint structure of this invention comprises two components which have sections that interfit in tongue and groove fashion, one within the other. Each component comprises a base section and a joint section extending from the base section. The female joint section of one component (hereinafter called the "first" component) is provided with a longitudinal access opening or slot having a width slightly less than the greatest width of the joint section of the other component. The male joint section of the other component (hereinafter called the "second" component) is provided with a relatively narrow longitudinal contraction opening or slot. The male joint section of the second component is designed to be inserted laterally into and be contained by the female joint section of the first component, with the outer diameter of the former and the inner diameter of the latter being substantially the same and with their axial midpoints coincident. The contraction space or slot in the male joint section of the second component is provided to permit the walls of the male joint section to elastically compress toward one another as that joint section is laterally inserted into the female joint section of the first component.

In a preferred embodiment of the joint structure of this invention, an elongated, radially-aligned locking member extends from the interior surface of the female joint section toward the opening therein and terminates at about the axial midpoint in an enlarged end section. This enlarged end section has a ledge-like surface on each side of the locking member which faces away from the joint section opening toward the base end of the locking member. The ends of the male joint section walls of the second component turn radially inward at the contraction slot with the wall ends terminating just short of the axial midpoint. As the male joint section of the second component is inserted into the female joint section of the first, the radially inward-extending tubular section walls of the former will contact the enlarged end of the locking member, and resiliently spread apart concurrently with the male joint section walls of the second component being compressed toward one another. When the two joint sections are completely interfitted, the joint section radially-inward extending wall ends will snap past the enlarged end of the locking member to bear against the ledge-like surfaces of the locking member. By reason of this construction, once the two joint sections are completely interfitted, they cannot be pulled apart because the inwardly-extending wall ends will bear against the aforesaid ledge-like surfaces of the locking member and prevent such separation. If it is desired to separate the two components, either they must be shifted axially relative to one another or a specially-designed tool must be moved axially along the ledge-like surfaces to spring the inwardly-extending wall ends of the second component out of engagement therewith.

FIGS. 1–6 depict various embodiments of the invention with similar elements being numbered in multiples of 100.

FIGURE 1 depicts a non-locking embodiment of this invention ocmprising first and second components 10 and 12, respectively. The first component 10 comprises a base section 14 and a female joint section 16 and is extruded as a unitary member. The second component comprises a base section 18 and a male joint section 20 and is extruded as a unitary member. The two joint sections 16 and 20 are elongated tubular sections and are partciularly designed for attachment to structural panels. The base section 14 is channel-shaped with parallel legs flanking opposite sides of the female joint section 16 and is designed to be attached to the parallel sides of a panel end 22 as shown. The elongated slot in the joint section 16 opens at the base of the channel-shaped base section 14 such that the base section 18 of component 12 can abut thereto when the tubular joint sections 16 and 20 are interfitted as shown. The base section 18 is L-shaped with the tubular joint section 20 extending outward from one of the legs and with the legs designed to be attached to edge and side of a panel end 24 as shown. The width of the elongated slot in the tubular joint section 16 is just slightly less than outer diameter of the tubular joint section 20 such that some force must be exerted to separate the interlocked tubular sections. The width of the elongated slot in the tubular joint section 20 is wide enough to permit the sides of the joint section 20 to resiliently compress toward one another during insertion of joint section 20 into joint section 16.

FIGURE 2 depicts a locking embodiment of this invention which is similar in basic construction to the FIGURE 1 joint, with both base sections being channel-shaped with parallel legs for retaining panel ends. The FIG. 2 joint further incorporates a radially-aligned locking member 126 extruded as a unitary element of component 110. Locking member 126 extends from the inner surafce of the tubular joint section 116 and terminates at about the axial midpoint thereof in an enlarged end. The enlarged end is provided with ledge-like contact surfaces 126a and 126b facing inward toward the base of locking member 126, and a rounded outer surface 126c. Thus, the locking member 126 resembles a blunt-ended arrow in cross-section. The tubular joint section 120 has side walls with radially-inward turned ends 120a and 120b which terminate just short of the axial midpoint and bear against the ledge-like surfaces 126a and 126b. The width of the longitudinal gap in the tubular joint section 120 is quite narrow such that the ends 120a and 120b are only slightly non-parallel when the tubular joint sections 116 and 120 are interfitted.

FIGURE 3 depicts a locking joint structure substantially similar to the FIG. 2 structure except that the end 226c of the locking member 226 is pointed and that the width of the longitudinal slot in the tubular joint section 220 is wider. This FIG. 3 structure is considered to be stiffer than the FIG. 2 structure in that it would take more force to interfit the two tubular sections. The width of the slot increases the angle of intersection between the inward turned ends and therefore the inward turned ends must deflect to a greater extent when inserted past the enlarged end of locking member 226. If the two components were extruded from aluminum, for example, the stiffness of the FIG. 3 structure would be greater than needed and the FIG. 2 structure would therefore be preferable.

FIGS. 4 and 5 depict a modification of the FIG. 3 joint structure suitable for making non-parallel joints. The FIG. 4 joint is a right-angle joint and the FIG. 5 joint is an obtuse-angle joint. In each of these embodiments, the female tubular jont section 316 stands out from the respective base section 314 with the longitudinal slot therein opening away from the base section as shown rather than opening at the juncture of the joint and base sections as in FIGS. 1–3. The tubular joint section 320 may stand away from the respective base section 318, as in FIG. 4, and be connected thereto by an integral web 319. The legs of base sections, 314 and 318, on opposite sides of their respective joint sections are parallel and are designed to confine panel ends 322 and 324 as shown. The FIGS. 4 and 5 embodiments can be interlocked after the panels 322 and 324 are in place.

The FIG. 5 joint structure is specially adapted to function as a roof ridge joint with panels 322 and 324 serving as two halves of a roof. The base section 318 is provided with two parallel depending legs 326 that are designed to be attached to or enclose the upper edge of a ridge beam or center bearing wall 328 for support of the ridge joint.

FIG. 6 depicts another roof ridge joint wherein the edges 314a of the base section 314 are doubled back and under to provide covered longitudinal slots. The inner edges of roof panels 322 and 324 are each fitted with an edge connecting member 330 which has parallel top and bottom legs 330a and 330b and a concave end 330c attached to the panel ends as shown, and an upper leg 330d adapted to be inserted into the slot formed in base section edges 314a. There must be sufficient space between the inturned base section edges 314a and the exterior side of tubular joint section 316 to permit the roof panels to be shifted up against the tubular joint section 320 so that the inturned edges 314a will clear the legs 330d when the component 310 is fitted into position. After the two components are interfitted, the roof panels can be shifted outwardly from the roof ridge until the upper legs 330d are locked into the slot formed by the inturned edges 314a.

FIG. 6 also depicts one manner of utilizing the FIG. 3 type of joint structure to join a vertical wall panel 228 to a roof panel 324. In this embodiment, the base section 214 is joined to the underside of the roof panel by screws or other appropriate means and the channel-shaped base section 218 is attached to the upper end of wall panel 228.

The threaded connecting device of FIG. 7 comprises an external screw 70 and an internal screw 71. Screw 70 has a hollow internally and externally threaded tapered shank 72 having longitudinal slots 74 therein and an allen head 78. The section of the shank adjacent the head underside, which is designed to pass through an enlarged hole 80 in a joint component base section wall 82, is unthreaded. Screw 71 has an untapered externally threaded shank 84 designed to thread into internally threaded shank 72 and spread the walls of shank 72 apart into the panel wall 86 to bind it therein, and an allen head 88 that seats in head 78. The shank of screw 71 can be hollow and provided with ampule 90 filled with adhesive. Ampule 90 is designed to be crushed as the shank 84 is threaded into shank 72 to release adhesive to bind shank 72 to the panel 86. This construction permits a firm bond to the panel 86 and yet also permits relative contraction and expansion between the joint component base section wall 82 and the panel wall 86 to the extent of the annular gap in base section hold 80. This device could be used, for example, to bind the FIGS. 4 and 5 joint structure base sections 314 and 318 to the panels 322 and 324 after assembly.

The panels depicted in FIGS. 1–6 could be fabricated from any material. A preferred construction, taking panels 322 and 324 as an example, is a foamed plastic or expanded material inner core 322a–324a faced on both surfaces with thin plastic or fiber glass skins 322b–324b and 322c–324c bonded thereto. The components of the joint structures depicted in FIGS. 1–3 can be bonded thereto with the recessed tubular joint sections 16, 116, 216 fitted into the panel core in contiguous contact therewith. The preferred core construction can be lightweight and yet exhibit good stability under compressive loads. The thin surface skins bonded thereto add no appreciable weight to the panel and yet exhibit good stability under tensile bending loads tending to buckle the panel. Thus, the combination of such a light weight and structurally rigid panel with the joint structure depicted, especially when the latter are fabricated from lightweight materials such as aluminum or plastic, provides a highly versatile panel or wall assembly. Such an assembly has particular utility in modular prefabricated construction as for houses, storage boxes and the like. FIGS. 8–12, for example, depict the application of joint, and joint-and-panel assemblies of this invention to a prefabricated house, and FIGS. 13 and 14 depict their application to a knock-down cargo box or crate.

The house comprises a floor 400 which a peripherally-mounted joint component, such as component 12 of FIG. 1, and two side walls 402 and 404 which may comprise three sections joined together vertically in the manner depicted in FIG. 3, and two end walls 406 and 408 which may also comprise three sections joined together vertically in the manner depicted in FIG. 3. The lower edges of the wall panels 402–408 are provided with joint components such as component 10 of FIG. 1 which interfit with the peripherally-mounted floor components 12. The adjacent corners of the end and side walls 402–408 are joined together by a joint structure such as depicted in FIG. 4. Thus, the walls can be attached to the floor and then joined at the corners in a simple manner by placing component 312 on the inside, component 310 on the outside, and locking the two components together, thereby in effect clamping the adjacent wall ends in proper position. The roof 410 would be assembled in the manner depicted in FIGS. 5 or 6 and the roof panels peripherally supported by the side and end walls 402–408 and centrally supported by center bearing wall 412. Bearing wall 412 would also be attached to the floor in the same manner as the end and side walls. Because the end, side and center walls will be restrained on all edges, there would be no need to employ a locking joint structure at the base, such as depicted in FIGS. 2 and 3, for example, but of course locking joint structures could be employed at the base if desired.

One particularly desirable feature of the house depicted is that a prepackaged plumbing module or assembly 414, including kitchen, lavatory and utility sections could be provided as depicted in FIGS. 8 and 10. The plumbing assembly has top, bottom and side joint components designed to mate with corresponding components in the roof, floor and walls so that it can be locked into position as a unit. By such an arrangement, all plumbing could be incorporated into a plumbing closet 414a with factory provided connections through the walls 414b and 414c for a washer and dryer, and bath facilities to be fitted thereto, and with factory provided kitchen facilities. Furthermore, all wiring can originate in this module and extend beneath the panel walls through the hollow interior of the male joint sections mounted on the floor. Such wires can be easily inserted through the longitudinal slots in the floor-mounted male joint sections.

Another desirable feature of the house depicted is that window moldings 418 can be provided, as shown in FIGS. 8 and 11–12, with joint structures whereby the vertical sides of window sections can be provided as at 420 with one component of a locking joint structure positioned to slidably ride on the other joint component provided on the vertical side window moldings; and whereby the top and bottom sides of window sections can be provided as at 422 with one component of a non-locking joint structure to releasably attach to the other joint component provided on the top and bottom window moldings. The exterior sections of window moldings can be provided with one component of a non-locking joint structure as at 424 adapted to receive the other joint component mounted on a window screen 426. The interior upper section of window moldings can be provided with one component of a locking joint structure as at 428 adapted to slidably receive segments 428a of the other joint component fabricated as curtain hook carriers as shown.

The cargo container depicted in FIGS. 13 and 14 employs a non-locking joint structure as in FIG. 1. The bottom and top panels 500 and 510 are provided on their respective surfaces that face one another with a peripheral joint component similar to component 12 shown in FIG. 1. The side panels 512, 514, 516 and 518 are provided in their top and bottom edges with corresponding components similar to component 10 shown in FIG. 1. Two opposing side panels 512 and 516 are also provided within their side edges with corresponding components similar to component 10 shown in FIG. 1, and the other side panels 514 and 518 are provided on their respective surfaces that face one another with side joint components similar to component 12 shown in FIG. 1 that interfit with the corresponding joint components in the side edges of panels 512 and 516. If desired, the corners formed by adjacent panels could alternately be restrained by a joint structure similar to that shown in FIG. 4, with or without the locking member 326 being provided.

The joint assemblies, described in the foregoing provide means for locking a prefabricated building together without the aid of nails, screws or standard type of building construction in the field. They are so designed and provide the fastest and most economical means of erection in the field. The locking system is so designed to lock adjoining wall, ceiling, roof and corner panels together. The locking system forms an excellent expansion joint and is weatherproof without the aid of compounds.

This locking system is designed to be used on prefabricated, prestressed structural building panels, to include walls, ceilings, roofs, floors, partitions and corner panels. They are not limited to these uses. The locking system was also designed to make quick installation of partitions in existing buildings, to install bulkhead partitions in aircraft and boats, especially where movable partitions are desirable.

This unique locking system is designed to be weatherproof when assembled dry. It is an expansion joint designed to allow movement in all desirable directions of the structural members. It is designed to be as close to earthquake proof as possible. The unique locking system allows each panel to move and flex within its own lock.

It is especially designed to be built of plastics and fiber glass which would warrant it being termite proof and fire resistant. It is not limited to these materials. This locking system may be used on prefabricated panels of any type materials to include wood, steel, aluminum and others which may be on the market. All the locks can be manufactured by the extruded manufacturing method but are not limited to this method.

The locking type joint structure can also be employed as a shock mounting by forming the male base section such that it can move into and out of the female joint section. When such a shock mounting is tensioned the forks of the male joint section (i.e. wall ends 120a and 120b of FIG. 2, for example) would resiliently swing outward to a certain extent. When the mounting is compressed, the walls of the male joint section would resiliently compress toward one another. Such a shock mounting could have thin male and female joint sections with their thickness less than their transverse width, as might be desired for shock mounting legs for electronic instruments, or could be elongated with tubular male and female joint sections.

Another feature of this invention, illustrated in FIG. 1 but applicable to all the joint structures described herein, is the provision of recesses 9 and 11 at the outer base sides of the joint section 20 that are not occupied by the joint section 16. These recesses can be filled with sealing compound to provide an unexposed, continuous weather seal.

It is believed that the invention will have been clearly understood from the foregoing detailed description of the now-proferred illustrated embodiment. Changes in the details of construction may be resorted to without departing from the spirit of the invention.

The embodiments of the invention in which an exclusive property or privilege is claimed are defined as follows:

1. A joint structure which comprises first and second components each having a base section and a joint section extending from the base section; the first component joint section having an arcuate wall defining a generally cylindrical cavity bound by a curved surface with an arcuate extent greater than 180° and with a longitudinal access opening into said cavity of a width less than the diameter of said cavity; and the second component joint section having an arcuate wall with an arcuate extent greater than 180° and an outer surface configuration substantially the same as that of said cavity and being transversely insertable into said cavity with the respective axial midpoints of the joint sections being coincident upon joinder, the wall of said second component joint section having a longitudinal contraction opening which divides the wall of the second component joint section into two sections, the contraction opening being of sufficient width to permit the wall sections of the second component joint section to elastically compress toward one another as the second component joint section is laterally inserted into the first component joint section.

2. A joint structure according to claim 1 wherein the base and joint sections of each of said first and second components are extruded as a unitary member.

3. A joint structure according to claim 1 wherein the first component base section is channel-shaped and the first component joint section extends between the channel legs of the base section with the longitudinal opening therein opening at the channel base of the base section.

4. A joint structure according to claim 1 wherein the first and second component base sections are angle-shaped and, when the first and second component joint sections are interfitted, form the inner and outer sides of an angle joint.

5. A joint structure according to claim 4 wherein the first and second base sections are right-angled with one joint section extending outward from the apex of the respective base section and the other joint section extending inward from the apex of the respective base section; and wherein the longitudinal opening in the first component joint section divides the wall thereof into two sections, each wall section extending arcuately from the first component base section.

6. A joint structure according to claim 1 wherein the second component base section is channel-shaped and the second component joint section extends outwardly from the channel base of the respective base section.

7. A joint structure which comprises first and second components each having a base section and a joint section extending from the base section, the respective joint sections being adapted to transversely interfit; the first component joint section being provided with a longitudinal access opening of a width slightly less than the width of the second component joint section; and the second component joint section being provided with a longitudinal contraction opening which divides the wall of the second component joint section into two sections, the contraction opening being of sufficient width to permit the wall sections of the second component joint section to elastically compress toward one another as the second component joint section is laterally inserted into the first component joint section; the first component joint section being provided with a locking member extending from the wall of the first component joint section radially inward toward the longitudinal opening in such joint section and terminating at about the axial midpoint of such a joint section in an enlarged end, the enlarged end being provided with ledge-like surfaces facing the base of said locking member; and the wall sections of the second component joint section being turned inward at the contraction opening and terminated just short of the axial midpoint of the second component joint section; the wall section ends of the second component joint section and the locking member of the first component joint section being constructed such that the joint sections, when interfitted, are restrained from the transverse separation by the wall section ends of the second component joint section bearing against the ledge-like surfaces of said locking member.

8. A joint structure according to claim 7 wherein the base and joint sections of each of said first and second components are extruded as a unitary member.

9. A joint structure according to claim 7 wherein the first component base section is channel-shaped and the first component joint section extends between the channel legs of the base section with the longitudinal opening therein opening at the channel base of the base section.

10. A joint structure according to claim 7 wherein the first and second component base sections are angle-shaped and, when the first and second component joint sections are interfitted, form the inner and outer sides of an angle joint.

11. A joint structure according to claim 10 wherein the first and second base sections are right-angled with one joint section extending outward from the apex of the respective base section and the other joint section extending inward from the apex of the respective base section; and wherein the longitudinal opening in the first component joint section divides the wall thereof into two sections, each wall section extending arcuately from the first component base section.

12. A joint structure according to claim 7 wherein the second component base section is channel-shaped and the second component joint section extends outwardly from the channel base of the respective base section.

13. An interlocking panel structure comprising first and second panels, first and second joint components each having a base section and a joint section extending from the respective base section; the first component joint section having an arcuate wall defining a generally cylindrical cavity bound by a curved surface with an arcuate extent greater than 180° and with a longitudinal access opening into said cavity of a width less than the diameter of said cavity; the second component joint section having an arcuate wall with an arcuate extent greater than 180° and an outer surface configuration substantially the same as that of said cavity and being transversely insertable into said cavity with the respective axial midpoints of the joint sections being coincident upon joinder, the wall of said component joint section having a longitudinal contraction opening which divides the wall of the second component joint section into two sections, the contraction opening being of sufficient width to permit the wall sections of the second component joint section to elastically compress toward one another as the second component joint section is laterally inserted into the first component joint section; and the panel edge sections to be joined by the joint structure and the joint components being constructed that the panel edge sections are restrained when the first and second component joint sections are laterally interfitted.

14. An interlocking panel structure according to claim 13 wherien the first and second component base sections are fixed to the respective first and second panel edge sections.

15. An interlocking panel structure according to claim 13 wherein the first and second component base sections are each angle shaped with two legs meeting at the apex, the opposing legs of the base sections being parallel and constructed to clamp panel edges therebetween when the two joint sections are interfitted.

16. A joint structure according to claim 13 wherein the first component base section is channel-shaped and the first component joint section extends between the channel legs of the base section with the longitudinal opening therein opening at the channel base of the base section.

17. A joint structure according to claim 13 wherein the first and second component base sections are angle-shaped and, when the first and second component joint section are interfitted, form the inner and outer sides of an angle joint.

18. A joint structure according to claim 17 wherein the first and second base sections are right-angled with one joint section extending outward from the apex of the respective base section and the other joint section extending inward from the apex of the respective base section; and wherein the longitudinal opening in the first component joint section divides the wall thereof into two sections, each wall section extending arcuately from the first component base section.

19. A joint structure according to claim 13 wherein the second component base section is channel-shaped and the second component joint section extends outwardly from the channel base of the respective base section.

20. An interlocking panel structure comprising first and second panels; first and second joint components each having a base section and a joint section extending from the respective base section; the first component joint section being provided with a longitudinal access opening of a width slightly less than the width of the second component joint section; the second component joint section being provided with a longitudinal contraction opening which divides the wall of the second component joint section into two sections, the contraction opening being of sufficient width to permit the wall sections of the second component joint section to elastically compress toward one another as the second component joint section is laterally inserted into the first component joint section; and the panel edge sections to be joined by the joint structure and the joint components being constructed such that the panel edge sections are restrained when the first and second component joint sections are laterally interfitted; the first component joint section being provided with a locking member extending from the wall of the first component joint section radially inward toward the longitudinal opening in such joint section and terminating at about the axial midpoint of such joint section in an enlarged end, the enlarged end being provided with ledge-like surfaces facing the base of said locking member; and the wall sections of the second component joint section being turned inward at the contraction opening and terminated just short of the actual midpoint of the second component joint section; the wall section end of the second component joint section and the locking member of the first component joint section being constructed such that the joint sections, when interfitted, are restrained from transverse separation by the wall section ends of the second component joint section bearing against the ledge-like surfaces of said locking member.

21. A prefabricated structure which comprises a plurality of panel walls; joint structures adapted to join wall edges of adjacent panel walls which each comprise a base section and a joint section extending from the base section; the first component joint section having an arcuate wall defining a generally cylindrical cavity bound by a curved surface with an arcuate extent greater than 180° and with a longitudinal access opening in said cavity of a width less than the diameter of said cavity; the second component joint section having an arcuate wall with an arcuate extent greater than 180° and an outer surface configuration substantially the same as that of said cavity and being transversely insertable into said cavity with the respective axial midpoints of the joint section being coincident upon joinder; the wall of said second component joint section having a longitudinal contraction opening which divides the wall of the second component joint section into two sections, the contraction opening being of sufficient width to permit the wall sections of the second component joint section to elastically compress toward one another as the second component joint section is laterally inserted into the first component joint section; and the panel edge sections to be joined by the joint structure and the joint component being constructed such that the panel edge sections are restrained when the first and second component joint sections are laterally interfitted.

22. The structure of claim 21 wherein parallel joint structures comprise base sections of channel-shaped configuration with parallel channel legs and the channel base of each base section adapted to enclose the respective panel wall edge; and wherein the first component joint section extends between the respective base parallel legs with the longitudinal opening at the channel base and the section extends between the respective base parallel legs the respective base section such that the first and second component base sections abut when the first and second component joint sections are interfitted.

23. The structure of claim 21 wherein corner joint structures comprise base sections of right-angle configuration with two legs meeting at the apex, the opposing legs of the base sections being parallel and constructed to clamp panel edges therebetween when the first and second component joint sections are interfitted.

24. The structure of claim 21 wherein such structure comprises a house having end and side panel walls mounted on a base by joint structures and joined together by joint structures, and having roof panels joined to the end and side walls by joint structures and joined at the roof ridge by a roof ridge joint structure.

25. The structure of claim 24 wherein the first and second component base sections of the roof ridge joint structure are vertically superimposed and are each angle shaped with two legs meeting at the apex, the opposing legs of the base sections being parallel and constructed to clamp roof panel edges therebetween when the two joint sections are interfitted, and wherein the lower of the two roof ridge joint base sections are provided with depending elongated legs adapted to enclose the upper end of a roof ridge support member; and including a roof ridge support member extending between the end wall panels with an upper end underlying the roof ridge joint structure.

References Cited

UNITED STATES PATENTS

| | | | |
|---|---|---|---|
| 2,100,238 | 11/1937 | Burgess | 52—461 X |
| 2,712,863 | 7/1955 | Busch | 52—79 |
| 2,784,814 | 3/1957 | Bright | 52—461 X |
| 2,947,040 | 8/1960 | Schultz | 52—582 |
| 3,151,711 | 10/1964 | De Ridder | 287—189.36 |
| 3,199,258 | 8/1965 | Jentoft et al. | 52—461 X |
| 3,242,625 | 3/1966 | Tillinghast | 52—461 |

FOREIGN PATENTS 202,340  7/1956  Australia.

FRANK L. ABBOTT, *Primary Examiner.*

PRICE C. FAW, JR., *Assistant Examiner.*

U.S. Cl. X.R.

52—282, 461, 582; 287—189.36